United States Patent
Chang et al.

(10) Patent No.: US 11,864,577 B2
(45) Date of Patent: Jan. 9, 2024

(54) MICROENCAPSULATED OIL-AND-FAT AND METHOD FOR PRODUCING THE SAME

(71) Applicant: Inner Mongolia Yili Industrial Group Co., Ltd., Hohhot (CN)

(72) Inventors: Pengfei Chang, Hohhot (CN); Biao Liu, Hohhot (CN); Xiaoyu Kong, Hohhot (CN)

(73) Assignee: INNER MONGOLIA YILI INDUSTRIAL GROUP CO., LTD., Inner Mongolia (CN)

( * ) Notice: Subject to any disclaimer, the term of this patent is extended or adjusted under 35 U.S.C. 154(b) by 791 days.

(21) Appl. No.: 16/635,881

(22) PCT Filed: Jul. 26, 2018

(86) PCT No.: PCT/CN2018/097137
§ 371 (c)(1),
(2) Date: Jan. 31, 2020

(87) PCT Pub. No.: WO2019/029370
PCT Pub. Date: Feb. 14, 2019

(65) Prior Publication Data
US 2020/0352211 A1   Nov. 12, 2020

(30) Foreign Application Priority Data
Aug. 9, 2017   (CN) .......................... 201710673299.0

(51) Int. Cl.
*A23P 10/30*   (2016.01)
*A23K 20/158*   (2016.01)
*A23K 40/30*   (2016.01)
*A23L 33/115*   (2016.01)
*A23L 3/3418*   (2006.01)
*A23L 3/36*   (2006.01)

(52) U.S. Cl.
CPC ............ *A23P 10/30* (2016.08); *A23K 20/158* (2016.05); *A23K 40/30* (2016.05); *A23L 3/3418* (2013.01); *A23L 3/36* (2013.01); *A23L 33/115* (2016.08)

(58) Field of Classification Search
CPC ....... A23P 10/30; A23K 20/158; A23K 40/30; A23L 33/115; A23L 2/3418; A23L 3/36
See application file for complete search history.

(56) References Cited

U.S. PATENT DOCUMENTS

| | | | | | |
|---|---|---|---|---|---|
| 4,564,475 A | * | 1/1986 | Masaichiro | ............. | A23L 33/12 554/80 |
| 5,601,760 A | * | 2/1997 | Rosenberg | ............. | A23C 15/14 521/76 |
| 2007/0098853 A1 | | 5/2007 | Van Lengerich et al. | | |

FOREIGN PATENT DOCUMENTS

| | | |
|---|---|---|
| CN | 1357408 A | 7/2002 |
| CN | 104622846 A | 5/2015 |
| WO | 94/01001 A1 | 1/1994 |
| WO | 2014/000599 A1 | 1/2014 |

OTHER PUBLICATIONS

Machine translation CN104622846(original provided by the applicant) (Year: 2015).*
Machine translation CN1357408(original provided by the applicant) (Year: 2002).*
"Oil, Plant fixed(solvent)" https://webprod.hc-sc.gc.ca/nhpid-bdipsn/prepReq.do?id=33&lang=eng (Year: 2023).*
Hee et al., "Production of Virgin Coconut Oil Microcapsules from Oil-in-Water Emulsion with Supercritical Carbon Dioxide Spray Drying," The Journal of Supercritical Fluids, http://dx.doi.org/10.1016/j.supflu.2017.07.037 (31 pages).
International Search Report and Translation of the ISR for PCT/CN2018/097137, dated Oct. 12, 2018 (6 pages).

* cited by examiner

*Primary Examiner* — Katherine D Leblanc
(74) *Attorney, Agent, or Firm* — Pillsbury Winthrop Shaw Pittman, LLP

(57) ABSTRACT

The present invention discloses a method for producing a microencapsulated oil-and-fat, comprising microencapsulating the oil-and-fat, wherein materials are subjected to carbon dioxide treatment during the microencapsulation, and the carbon dioxide treatment comprises: introducing carbon dioxide into the materials, and then refrigerating the materials. The producing method of the invention is simple, effectively improves the embedding rate of the oil-and-fat in the microencapsulated oil-and-fat, improves the stability of the oil-and-fat, and can prolong the shelf-life of a corresponding final product. The present invention also discloses a microencapsulated oil-and-fat produced by the method.

9 Claims, No Drawings

US 11,864,577 B2

MICROENCAPSULATED OIL-AND-FAT AND METHOD FOR PRODUCING THE SAME

CROSS-REFERENCE TO RELATED APPLICATIONS

This application is a § 371 National Stage of International (PCT) Application No. PCT/CN2018/097137, filed Jul. 26, 2018, which claims the benefit of and priority to Chinese Application No. 201710673299.0, filed Aug. 9, 2017, the content of which is hereby incorporated by reference in their entirety.

TECHNICAL FIELD

The present invention relates to the technical field of production of microencapsulated oil-and-fat. More specifically, the present invention relates to a microencapsulated oil-and-fat and a method for producing the same.

BACKGROUND ART

Conventional oil-and-fat are mostly viscous liquids, having poor flowability, and in some cases they are difficult to mix well with other starting materials. The direct exposure of conventional oil-and-fat to the air can cause a series of hydrolysis and oxidation processes due to the influence of environment such as light and temperature, which not only leads to the loss of nutrients, but even the generation of toxic substances, limiting the application of oil-and-fat in the food processing industry. In the prior art, powdered oil-and-fat have been prepared by adsorbing oil-and-fat with starch or flour in order to solve the above problems. The powdered oil-and-fat obtained by the two methods have a common disadvantage, i.e., the oil-and-fat adhere to the surface of a carrier and are still exposed to the air, and the processing processes increase the specific surface area of the oil-and-fat, resulting in faster oxidation and deterioration of the oil-and-fat.

With the development of microencapsulation technology, the application of oil-and-fat has been rapidly developed. The microencapsulation of oil-and-fat not only increases the flowability and dispersibility of the oil-and-fat, but also allows the oil-and-fat to be embedded within a wall material, thereby avoiding the influence of light, heat and oxygen, and enhancing the oxidation stability of the oil-and-fat. Meanwhile, the encapsulated oil-and-fat are easier to be added to foods as starting materials.

However, the properties and characteristics of wall materials are important factors affecting the characteristics of microcapsules. The selection of wall materials is an important problem in the study of microencapsulation of oil-and-fat. Studies have shown that the type and proportion of a wall material will affect the structure and size of corresponding microcapsules, for example, formation of cracks or pores on the surface of microcapsules, low embedding rate, and poor oxidation stability of oils. In addition, in order to solve the problem associated with low embedding rate of oil-and-fat, the current microencapsulated oil-and-fat powder has a content of a core material of about 20-60%, and the content is low, which limits the application scope of the oil-and-fat to some extent.

CONTENTS OF THE INVENTION

In view of the above problems, a first object of the present invention is to provide a method for producing a microencapsulated oil-and-fat. The producing method effectively improves the embedding rate of the oil-and-fat, improves the stability of the oil-and-fat, and prolongs the storage shelf life of the oil-and-fat.

A second object of the present invention is to provide a microencapsulated oil-and-fat.

In order to achieve the above first object, the present invention provides a method for producing a microencapsulated oil-and-fat, which method comprises microencapsulating the oil-and-fat, wherein materials are subjected to carbon dioxide treatment during the microencapsulation, and the carbon dioxide treatment comprises: introducing carbon dioxide into the materials, and then refrigerating the materials.

The materials mentioned in the present invention refer to the starting materials required in the production of the microencapsulated oil-and-fat. The microencapsulated oil-and-fat in the present invention comprises oil-and-fat as a core material which is embedded.

The oil-and-fat described in the present invention collectively refers to, in a broad sense, liquid oils and solid and semi-solid fats. According to a preferred embodiment of the invention, the oil-and-fat is selected from the group consisting of vegetable oils and/or animal oil-and-fats.

More preferably, the vegetable oil includes, but is not limited to, one or more selected from the group consisting of soybean oil, rapeseed oil, peanut oil, hemp oil, cottonseed oil, walnut oil, palm oil, coconut oil, corn oil, and sunflower oil. For example, the rapeseed oil includes, but is not limited to, low erucic acid rapeseed oil.

More preferably, the animal oil-and-fat is one or more selected from the group consisting of fish oil, whale oil, lard, mutton tallow, beef tallow and cream. For example, the fish oil includes, but is not limited to, one selected from the group consisting of tuna oil, mackerel oil, menhaden oil, dab oil, salmon oil, cod liver oil, whale oil, seal oil, and the like.

According to a preferred embodiment of the present invention, the carbon dioxide treatment further comprises removing carbon dioxide from the materials, after refrigerating the materials, wherein the method for removing carbon dioxide from the materials includes, but is not limited to, physical adsorption, high temperature removal, chemical absorption, and the like.

According to a preferred embodiment of the present invention, during the carbon dioxide treatment, the amount of carbon dioxide introduced into the materials is 1000-5000 ppm. In this scope, the embedding rate of the oil-and-fat is higher, and the stability of the oil-and-fat is better. More preferably, the amount of carbon dioxide introduced is from 1000 to 3000 ppm.

According to a preferred embodiment of the invention, the refrigeration temperature is of 1-5° C., more preferably of 3-4° C.

According to a preferred embodiment of the invention, the refrigeration time is of 1-8 h, more preferably of 4-6 h.

According to a preferred embodiment of the invention, the producing method comprises using an embedding wall material and microencapsulating the oil-and-fat by a spray drying process.

According to a preferred embodiment of the invention, the carbon dioxide treatment of the material is carried out between at least any two adjacent steps in the microencapsulation process.

According to a preferred embodiment of the invention, the microencapsulation process comprises, but is not limited to, the following steps of compounding, refining, emulsifying, homogenizing, and spray drying. In this case, the time at which the carbon dioxide treatment is carried out includes, but is not limited to, at a time between the aforementioned compounding step and refining step, or at a time between the refining step and emulsifying step, or at a time between the emulsifying step and homogenizing step, or at a time between the homogenizing step and the spraying step. More preferably, the carbon dioxide treatment is carried out between the homogenizing step and the spray drying step. At this time point, the embedding effect for the oil-and-fat is better.

According to a preferred embodiment of the invention, the homogenizing pressure is between 40 and 70 MPa.

According to a preferred embodiment of the present invention, during the spray drying, the inlet air temperature is controlled at 120-185° C., the outlet air temperature is controlled at 60-85° C., and the spray drying pressure is 160-180 kPa.

According to a preferred embodiment of the present invention, the producing method of the present invention further comprises subjecting the resulted product to an anti-caking treatment after the oil-and-fat is microencapsulated. For example, an anti-caking agent or the like is added.

According to a preferred embodiment of the present invention, the dry matter of the microencapsulated oil-and-fat comprises 25-70% of oil-and-fat, and 25-70% of an embedding wall material, expressed in mass percentage, wherein the "dry matter" in the present invention means other materials which do not contain water in the starting materials.

According to a preferred embodiment of the present invention, the embedding wall material for microencapsulation suitable for use in the present invention includes, but is not limited to, one or more selected from the group consisting of dairy product, white granulated sugar, starch, maltodextrin, solid corn syrup, gelatin and chitosan. Preferably, the embedding wall material used for the microencapsulation is selected from one or more of the group consisting of dairy product, white granulated sugar, starch, maltodextrin, and solid corn syrup. More preferably, the dairy product is selected from one or both of whey protein powder, skim milk powder, lactose and casein powder; and the starch is corn starch.

More preferably, in the dry matter of the microencapsulated oil-and-fat, the oil-and-fat is present in amount of 30-70% by mass. Further, the mass percentage of the oil-and-fat may also be, but is not limited to, 30-60%, 35-60%, 62-70%, and the like.

More preferably, in the dry matter of the microencapsulated oil-and-fat, the embedding wall material is present in an amount of 30-60% by mass. Further, the mass percentage of the embedding wall material may also be, but is not limited to, 35-60%, 40-60%, and the like.

According to a preferred embodiment of the present invention, the dry matter of the microencapsulated oil-and-fat further comprises: 0-1.5% of an emulsifier and/or 0-7% of an antioxidant and/or 0-0.3% of an anti-caking agent, expressed in mass percentage.

Preferably, the emulsifier is a food additive which can function to emulsify an oil-and-fat, including but not limited to, one or more selected from the group consisting of phospholipid, propylene glycol fatty acid ester, pectin, propylene glycol alginate, sodium starch octenyl succinate, glyceryl mono- or di-fatty acid ester and monoglycerol succinate.

Further, in the above dry matter, the amount of an emulsifier added may further be, but is not limited to, 0, 0.1 to 1.5%, 0.1 to 1.2%, 0.5 to 1.2%, and the like. Wherein, when the amount of an emulsifier added is 0, the emulsification mode may be a physical emulsification, such as high shear emulsification.

In the present invention, the antioxidant is a food additive for preventing oil-and-fat from oxidation, and the antioxidant suitable for use in the present invention includes, but is not limited to, a source material of vitamin C and/or vitamin E. For example, the antioxidant includes, but is not limited to, one or several selected from the group consisting of sodium L-ascorbate, L-ascorbic acid, dl-α-tocopherol acetate, dl-α-tocopherol, ascorbyl palmitate, mixed tocopherols, and α-tocopherol.

In the present invention, the anti-caking agent is a food additive for preventing powders from agglomeration and increasing flowability of powders, and the anti-caking agent suitable for use in the present invention includes, but is not limited to, one or more selected from the group consisting of tricalcium phosphate, silica, and the like.

According to a preferred embodiment of the present invention, the starting materials of the microencapsulated oil-and-fat not only comprise the above dry matter, but also comprise water in a proper amount for compounding the materials.

In order to achieve the above second object, the present invention also provides a microencapsulated oil-and-fat which is produced by the above producing method.

Unless otherwise stated, the starting materials described in the present invention are commercially available or are obtained by conventional technical means in the art. In addition, unless otherwise stated, the refinement described in the present invention means that the starting materials are refined to 280 μm or less.

The Beneficial Effects of the Present Invention are as Follows:

In the method of producing a microencapsulated oil-and-fat of the invention, the carbon dioxide treatment of the materials in the process of microencapsulation of the oil-and-fat improves the embedding effect of the oil-and-fat, and the resultant microencapsulated oil-and-fat has a reduced oil content on the surface, a high embedding rate and a long-term anti-oxidation stability, and can be applied in many fields such as foods and feeds, prolonging the shelf life of corresponding final products. In the producing method of the present invention, the oil-and-fat in the starting materials can still be well embedded, for example, at an amount higher than a conventional value of 60%.

SPECIFIC MODE FOR CARRYING OUT THE INVENTION

In order to more clearly illustrate the invention, the invention will be further described in conjunction with the following preferred examples. It should be understood by a person skilled in the art that the contents described below are illustrative but not restrictive, and should not be construed as limiting the scope of the invention.

Example 1

The composition of dry matter of starting materials of a microencapsulated oil-and-fat is, expressed in mass percentage, 60% of low erucic acid rapeseed oil, 19.5% of whey protein powder, 15.3% of corn starch, 1% of phospholipid, 4% of sodium L-ascorbate, and 0.2% of tricalcium phosphate.

Preparation of the microencapsulated oil-and-fat:
1) compounding: the low erucic acid rapeseed oil, whey protein powder, corn starch and L-ascorbate were dissolved in water at a temperature of about 65° C., premixed, stirred, and mixed homogenously;
2) refinement: the obtained premix was refined by grinding in a colloid mill;
3) emulsification: the phospholipid was added as an emulsifier, and mixed homogenously under stirring;
4) carbon dioxide treatment: 2000 ppm carbon dioxide was introduced into the mixture obtained in step 3) and then the mixture was refrigerated at 4° C. for 4 h, after which carbon dioxide was removed by physical adsorption;
5) homogenization: the mixture obtained in step 4) was homogenized at a pressure of 40 MPa;
6) spray drying: the mixture was spray-dried, wherein the inlet air temperature was of 120° C., the outlet air temperature was of 80° C., and the spray pressure was of 170 KPa during the drying; and
7) after the powdered mixture was cooled to room temperature, tricalcium phosphate as an anti-caking agent was added thereto, and uniformly mixing was carried out to obtain a powdery microencapsulated oil-and-fat in which the oil-and-fat was embedded.

Example 2

The composition of dry matter of starting materials of a microencapsulated oil-and-fat is, expressed in mass percentage, 50% of soybean oil, 20% of whey protein powder, 25.9% of maltodextrin, 1% of monoglycerol succinate, 3% of dl-α-tocopherol, and 0.1% of silica.

Preparation of the microencapsulated oil-and-fat:
1) compounding: soybean oil, whey protein powder, maltodextrin and dl-α-tocopherol were dissolved in water at a temperature of about 60° C., premixed, stirred, and mixed homogenously;
2) refinement: the obtained premix was refined by grinding in a colloid mill;
3) emulsification: monoglycerol succinate was added as an emulsifier, and mixed homogenously under stirring;
4) homogenization: the mixture obtained in step 3) was homogenized at a pressure of 40 MPa;
5) carbon dioxide treatment: 1000 ppm carbon dioxide was introduced into the mixture obtained in step 4) and then the mixture was refrigerated at 4° C. for 3 h;
6) spray drying: the mixture was spray-dried, wherein the inlet air temperature was of 170° C., the outlet air temperature was of 65° C., and the spray pressure was of 160 KPa during the drying; and
7) after the powdered mixture was cooled to room temperature, silica as an anti-caking agent was added thereto, and uniformly mixing was carried out to obtain a powdery microencapsulated oil-and-fat in which the oil-and-fat was embedded.

Example 3

The composition of dry matter of starting materials of a microencapsulated oil-and-fat is, expressed in mass percentage, 35.6% of corn oil, 34.1% of maltodextrin, 26% of casein powder, 2% of phospholipid, 2% of ascorbyl palmitate, and 0.3% of silica.

Preparation of the Microencapsulated Oil-and-Fat:
1) compounding: the corn oil, maltodextrin, casein powder and ascorbyl palmitate were dissolved in water at a temperature of about 65° C., premixed, stirred, and mixed homogenously;
2) refinement: the obtained premix was refined by grinding in a colloid mill;
3) carbon dioxide treatment: 1000 ppm carbon dioxide was introduced into the mixture obtained in step 2) and then the mixture was refrigerated at 4° C. for 4 h, after which carbon dioxide was removed by physical adsorption;
4) emulsification: phospholipid is added as an emulsifier, and mixed homogenously under stirring;
5) homogenization: the mixture obtained in step 4) was homogenized at a pressure of 45 MPa;
6) spray drying: the mixture was spray-dried, wherein the inlet air temperature was of 120° C., the outlet air temperature was of 80° C., and the spray pressure was of 165 KPa during the drying; and
7) after the powdered mixture was cooled to room temperature, silica as an anti-caking agent was added thereto, and uniformly mixing was carried out to obtain a powdery microencapsulated oil-and-fat in which the oil-and-fat was embedded.

Example 4

The composition of dry matter of starting materials of a microencapsulated oil-and-fat is, expressed in mass percentage, 40% of peanut oil, 40% of skim milk powder, 14.8% of corn starch, 1% of phospholipid, 4% of sodium L-ascorbate and 0.2% of tricalcium phosphate.

1) compounding: the peanut oil, skim milk powder, corn starch and sodium L-ascorbate were dissolved in water at a temperature of about 55° C., premixed, stirred, and mixed homogenously;
2) carbon dioxide treatment: 2000 ppm carbon dioxide was introduced into the mixture obtained in step 1) and then the mixture was refrigerated at 4° C. for 4 h, after which carbon dioxide was removed by physical adsorption;
3) refinement: the obtained premix was refined by grinding in a colloid mill;
4) emulsification: phospholipid was added as an emulsifier, and mixed homogenously under stirring;
5) homogenization: the mixture obtained in step 4) was homogenized at a pressure of 50 MPa;
6) spray drying: the mixture was spray-dried, wherein the inlet air temperature was of 150° C., the outlet air temperature was of 85° C., and the spray pressure was of 170 KPa during the drying; and
7) after the powdered mixture was cooled to room temperature, tricalcium phosphate as an anti-caking agent was added thereto, and uniformly mixing was carried out to obtain a powdery microencapsulated oil-and-fat in which the oil-and-fat was embedded.

Example 5

The composition of dry matter of starting materials of a microencapsulated oil-and-fat is, expressed in mass percentage, 65% of soybean oil, 5.9% of whey protein powder, 25% of maltodextrin, 1% of monoglycerol succinate, 3% of dl-α-tocopherol, and 0.1% of silica.

Preparation of the Microencapsulated Oil-and-Fat:
1) compounding: soybean oil, whey protein powder, maltodextrin and dl-α-tocopherol were dissolved in water at a temperature of about 60° C., premixed, stirred, and mixed homogenously;
2) refinement: the obtained premix was refined by grinding in a colloid mill;
3) emulsification: monoglycerol succinate was added as an emulsifier, and mixed homogenously under stirring;
4) homogenization: the mixture obtained in step 3) was homogenized at a pressure of 40 MPa;
5) carbon dioxide treatment: 1000 ppm carbon dioxide was introduced into the mixture obtained in step 4) and then the mixture was refrigerated at 4° C. for 3 h;
6) spray drying: the mixture was spray-dried, wherein the inlet air temperature was of 170° C., the outlet air temperature was of 65° C., and the spray pressure was of 180 KPa during the drying; and
7) after the powdered mixture was cooled to room temperature, silica as an anti-caking agent was added thereto, and uniformly mixing was carried out to obtain a powdery microencapsulated oil-and-fat in which the oil-and-fat was embedded.

Example 6

The composition of dry matter of starting materials of a microencapsulated oil-and-fat was of: 30% of tuna oil, 40% of whey protein powder, 25.9% of maltodextrin; 1% of sodium starch octenyl succinate, 3% of dl-α-tocopherol, 0.1% of silica.

Preparation of the Microencapsulated Oil-and-Fat:
1) compounding: tuna oil, whey protein powder, maltodextrin and dl-α-tocopherol were dissolved in water at a temperature of about 60° C., premixed, stirred, and mixed homogenously;
2) refinement: the obtained premix was refined by grinding in a colloid mill;
3) emulsification: sodium starch octenyl succinate was added as an emulsifier, and mixed homogenously under stirring;
4) homogenization: the mixture obtained in step 3) was homogenized at a pressure of 40 MPa;
5) carbon dioxide treatment: 3000 ppm carbon dioxide was introduced into the mixture obtained in step 4) and then the mixture was refrigerated at 4° C. for 5 h;
6) spray drying: the mixture was spray-dried, wherein the inlet air temperature was of 170° C., the outlet air temperature was of 65° C., and the spray pressure was of 160 KPa during the drying; and
7) after the powdered mixture was cooled to room temperature, silica as an anti-caking agent was added thereto, and uniformly mixing was carried out to obtain a powdery microencapsulated oil-and-fat in which the oil-and-fat was embedded.

Comparative Example 1

Example 1 was repeated under the same conditions as those in Example 1, except that the carbon dioxide treatment as the step 4) was not carried out, to prepare a microencapsulated oil-and-fat.

Comparative Example 2

Example 2 was repeated under the same conditions as those in Example 2, except that the carbon dioxide treatment as the step 5) was not carried out, to prepare a microencapsulated oil-and-fat.

Comparative Example 3

Example 3 was repeated under the same conditions as those in Example 3, except that the carbon dioxide treatment as the step 3) was not carried out, to prepare a microencapsulated oil-and-fat.

Test Example 1

The embedding rate and stability of the microencapsulated oil-and-fat obtained in each of the examples and the comparative examples were tested.

Method for testing the embedding rate: a certain amount of the surface oil of microcapsules was dissolved in a certain amount of petroleum ether, after continuously shaking for 5 minutes, the solvent was removed by drying, and the amount of surface oil was calculated. The results were shown in Table 1. The formula for calculating the embedding rate of oil-and-fat was:

$$\text{embedding rate (\%)} = \frac{\text{total amount of oil-and-fat} - \text{amount of surface oil}}{\text{total amount of oil-and-fat}}$$

Method for testing the stability: induction time (IP) was tested: the induction time (IP) of the microencapsulated oil-and-fat of each of the examples and the comparative examples was tested using ML Oxipres, an apparatus for analyzing the oxidative stability of oil-and-fat, to determine the stability thereof, wherein the longer the induction time, the better the stability of the sample. The test was carried out at a temperature of 95° C. and an oxygen partial pressure of 5 bar. The results were shown in Table 1.

It could be seen from the data in the Table 1 that: the embedding rate of oil-and-fat of the microencapsulated oil-and-fat prepared by the invention is above 96%, which is much higher than that of the microencapsulated oil-and-fat prepared without carbon dioxide treatment. In addition, the microencapsulated oil-and-fat prepared by the present invention have a better stability and could prolong the shelf life of corresponding final products.

TABLE 1

Embedding rates and induction times of products in examples and comparative examples

| Sample | Embedding rate of oil-and-fat/% | Induction time/h |
| --- | --- | --- |
| Example 1 | 97.5 | 8.8 |
| Example 2 | 98.8 | 9.1 |
| Example 3 | 96.3 | 10.5 |
| Example 4 | 91.8 | 7.1 |
| Example 5 | 93.2 | 7.4 |
| Example 6 | 92.7 | 11.2 |
| Comparative example 1 | 88.4 | 4.8 |
| Comparative example 2 | 88.7 | 5.2 |
| Comparative example 3 | 87.1 | 6.4 |

The above-described examples of the present invention are merely exemplified to clearly illustrate the present invention and not to limit the embodiments of the present invention. Other variations or modifications of the various forms may be made by a person skilled in the art in light of the above description. It is not possible to exhaust all implementations herein. It is to be understood that various obvious variations and modifications derived from the technical solutions of the present invention are still within the scope of the invention.

What is claimed is:

1. A method for producing a microencapsulated oil-and-fat, wherein the method comprises microencapsulating the oil-and-fat in an embedding wall material, wherein at least the oil-and-fat and the embedding wall material are subjected to carbon dioxide treatment during the microencapsulation, and the carbon dioxide treatment comprises: introducing carbon dioxide into the at least the oil-and-fat and the embedding wall material refrigerating the materials for a period of time of 1-8 hours, and removing the carbon dioxide after refrigerating the materials.

2. The method according to claim 1, wherein during the carbon dioxide treatment, the carbon dioxide is introduced into the at least the oil-and-fat and embedding wall material in an amount of 1000-5000 ppm, and refrigerating is carried out at a temperature of 1-5° C. for a period of time of 4-6 h.

3. The method according to claim 1, wherein the carbon dioxide treatment is carried out between at least any two adjacent steps in the microencapsulation process.

4. The method according to claim 1 wherein the microencapsulation comprises the steps of compounding, refining, emulsifying, homogenizing, and spray drying.

5. The method according to claim 1, wherein the oil-and-fat is selected from vegetable oils and/or animal oil-and-fats; wherein the vegetable oil is one or more selected from the group consisting of soybean oil, rapeseed oil, corn oil, and sunflower oil; and wherein the animal oil-and-fat is one or more selected from the groups consisting of fish oil, whale oil, lard, mutton tallow, beef tallow and cream.

6. The method according to claim 1, wherein the microencapsulated oil-and-fat comprises a dry matter, wherein the dry matter comprises: 25-70% of oil-and-fat, and 25-70% of the embedding wall material, expressed in mass percentage.

7. The method according to claim 6, wherein the embedding wall material is one or more selected from the group consisting of dairy product, lactose, white, granulated sugar, starch, maltodextrin, and solid corn syrup.

8. The method according to claim 6, wherein the dry matter of the microencapsulated oil-and-fat further comprises: 0-1.5% of an emulsifier and/or 0-7% of an antioxidant and/or 0-0.3% of an anti-caking agent, expressed in mass percentage;
wherein the emulsifier is one or more selected from the group consisting of phospholipid, propylene glycol fatty acid ester, pectin, propylene glycol alginate, sodium starch octenyl succinate, glyceryl mono- or di-fatty acid ester and monoglycerol succinate;
wherein the antioxidant is a source material of vitamin C and/or vitamin E; and
wherein the anti-caking agent is one or more selected from the group consisting of tricalcium phosphate and silica.

9. The method according to claim 1, wherein during the carbon dioxide treatment, the carbon dioxide is introduced into the at least the oil-and-fat and embedding wall material in an amount of 1000 to 3000 ppm, and refrigerating is carried out at a temperature of 1-5° C. for a period of time of 4-6-h.

* * * * *